US011361585B2

United States Patent
Chen et al.

(10) Patent No.: US 11,361,585 B2
(45) Date of Patent: Jun. 14, 2022

(54) METHOD AND SYSTEM FOR FACE RECOGNITION VIA DEEP LEARNING

(71) Applicant: ZKTECO USA, LLC, Fairfield, NJ (US)

(72) Inventors: Shukai Chen, Beijing (CN); Feiyang Tong, Huainan (CN)

(73) Assignee: ZKTECO USA LLC, Fairfield, NJ (US)

( * ) Notice: Subject to any disclaimer, the term of this patent is extended or adjusted under 35 U.S.C. 154(b) by 0 days.

(21) Appl. No.: 16/177,952

(22) Filed: Nov. 1, 2018

(65) Prior Publication Data

US 2019/0377930 A1    Dec. 12, 2019

(30) Foreign Application Priority Data

Jun. 11, 2018 (CN) .......................... 201810594129.8

(51) Int. Cl.
*G06V 40/12* (2022.01)
*G06K 9/62* (2022.01)
*G06N 3/08* (2006.01)

(52) U.S. Cl.
CPC ....... *G06V 40/1365* (2022.01); *G06K 9/6262* (2013.01); *G06N 3/08* (2013.01); *G06V 40/1347* (2022.01)

(58) Field of Classification Search
None
See application file for complete search history.

(56) References Cited

U.S. PATENT DOCUMENTS

| | | | | |
|---|---|---|---|---|
| 2017/0147868 A1* | 5/2017 | Sun | ............... | G06K 9/00288 |
| 2017/0360412 A1* | 12/2017 | Rothberg | ............... | A61B 8/085 |
| 2019/0019100 A1* | 1/2019 | Roques-Carmes | .. | G06N 3/0445 |
| 2019/0147318 A1* | 5/2019 | Howard | ............... | G06N 3/0454 |
| | | | | 706/27 |
| 2019/0347826 A1* | 11/2019 | Zhang | ...................... | G06N 3/08 |

FOREIGN PATENT DOCUMENTS

| CN | 104866829 B | * | 5/2015 |
| CN | 107832794 A | * | 3/2018 |
| CN | 108875536 | * | 11/2018 |

OTHER PUBLICATIONS

ShuffleNet: An Extermely Efficient Convolutional Neural Network for Mobile Devices, Dec. 2017, Zhou et al.*

* cited by examiner

*Primary Examiner* — Fan Zhang
(74) *Attorney, Agent, or Firm* — Venable LLP (57) ABSTRACT

Embodiments of the present application disclose a deep learning-based face identification method and a related product. The method is applied to an electronic apparatus. The method includes: acquiring an aligned face image, and scaling the face image at a preset ratio to obtain a target image; extracting a pixel matrix of the target image, inputting the pixel matrix to the neural network model, and executing multilayer computing to obtain a computing result; and calculating a cosine similarity degree between the computing result and a facial template vector, wherein comparison is successful if the cosine similarity degree is greater than a preset threshold. The embodiments of the present application help improve the identification success rate and the identification speed.

13 Claims, 4 Drawing Sheets

FIG. 5 ial Intelligence (AI)
METHOD AND SYSTEM FOR FACE RECOGNITION VIA DEEP LEARNING

CROSS REFERENCE TO RELATED APPLICATION

The present application claims priority to Chinese Patent Application No. 201810594129.8 filed with the Chinese Patent Office on Jun. 11, 2018, which is incorporated herein by reference in its entirety.

TECHNICAL FIELD

The present application relates to the technical field of computer visual identification, and in particular, to a deep learning-based face identification method and a related product.

BACKGROUND ART

As it is easy to capture biometric features of a face, the face identification technology is applied to technical fields such as monitoring, security and protection, finance, and so on. With the development of the Artificial Intelligence (AI) technology, the speed and success rate of face identification have been significantly improved. Currently, face identification is generally implemented in the following two manners: (1) a face image is input to a trained neural network model, face features in the face image are extracted layer by layer to output a final feature map, and the final feature map is compared with a template to identify the face; however, in the process of face extraction layer by layer, a part of face features are lost, and therefore the identification rate is low. (2) a residual network (Resnet) is constructed to carry out feature fusion. However, as the Resnet network becomes deeper, the feature map has too many dimensions, and a computing speed is low. Moreover, the Resnet network has large memory and cannot be embedded into a terminal for face identification.

SUMMARY OF THE INVENTION

Embodiments of the present application provide a neural network model for face identification and a related product, so as to carry out fusion of a feature map and improve the speed and accuracy rate of face identification.

According to a first aspect, an embodiment of the present application provides a neural network model for face identification, wherein the network model at least includes:

a first convolutional layer, a second convolutional layer, a third convolutional layer, a first bottleneck network (i.e., first bottlenecks), a second bottleneck network (i.e., second bottlenecks), a third bottleneck network (i.e., third bottlenecks), a fourth bottleneck network (i.e., fourth bottlenecks), a first pooling layer, a second pooling layer, a third pooling layer and a fourth pooling layer;

the first convolutional layer, the first bottlenecks, the first pooling layer, the second bottlenecks, the second convolutional layer, the second pooling layer, the third bottlenecks, the third convolutional layer, the third pooling layer, the fourth bottlenecks and the fourth pooling layer are connected in series sequentially; and the first convolutional layer, the first bottlenecks, the first pooling layer, the second bottlenecks, the second convolutional layer, the second pooling layer, the third bottlenecks, the third convolutional layer, the third pooling layer, the fourth bottlenecks and the fourth pooling layer are densely connected according to a dense connection policy of a dense network (Densenet).

According to a second aspect, an embodiment of the present application provides a deep learning-based face identification method, wherein the method is applied to the neural network model in the first aspect, and the method includes:

acquiring an aligned face image, and scaling the face image at a preset ratio to obtain a target image;

extracting a pixel matrix of the target image, inputting the pixel matrix to the neural network model, and executing multilayer computing to obtain a computing result; and calculating a matching value between the computing result and a facial template, wherein comparison is successful if the matching value is greater than a preset threshold.

According to a third aspect, an embodiment of the present application provides an electronic apparatus for deep learning-based face identification, wherein the electronic apparatus includes:

an acquisition unit configured to acquire an aligned face image, and scale the face image at a preset ratio to obtain a target image;

an extraction unit configured to extract a pixel matrix of the target image, input the pixel matrix to a trained neural network model, and execute multilayer forward computing to obtain a computing result; and a calculation unit configured to calculate a matching value between the computing result and a facial template, wherein comparison is successful if the matching value is greater than a preset threshold.

According to a fourth aspect, an embodiment of the present application provides an electronic apparatus, including one or more processors, one or more memories, one or more transceivers, and one or more programs, wherein the one or more programs are stored in the one or more memories, and are configured to be executed by the one or more processors, and the one or more programs include instructions for performing steps in the method according to the second aspect.

According to a fifth aspect, an embodiment of the present application provides a computer readable storage medium that stores a computer program for electronic data interchange, wherein the computer program enables a computer to execute the method according to the second aspect.

Implementing the embodiments of the present application has the following beneficial effects:

It can be seen that, in the embodiments of the present application, four bottleneck networks (i.e., bottlenecks) are connected in series by using a dense connection policy of a dense network (Densenet), thus ensuring that input of each bottleneck network (i.e., bottlenecks) comes from output of all the previous bottlenecks. That is, feature fusion is performed on a feature map of all the previous bottlenecks and then the result is output to the next bottlenecks. In such a feature fusion manner, more face features can be extracted. Therefore, the success rate of face identification is improved. Moreover, a 1*1 convolutional layer is connected in series after each bottleneck network (i.e., bottlenecks), thus reducing dimensions of input data of each bottleneck network (i.e., bottlenecks), and improving the speed of face identification.

BRIEF DESCRIPTION OF THE DRAWINGS

In order to illustrate the technical solutions in the embodiments of the present application more clearly, the accompanying drawings required for describing the embodiments are introduced briefly in the following. It is apparent that the accompanying drawings in the following description are only some embodiments of the present application. Those of ordinary skill in the art can obtain other drawings according to the accompanying drawings without creative efforts.

DETAILED DESCRIPTION

The technical solutions in the embodiments of the present application are described clearly and completely in the following with reference to the accompanying drawings in the embodiments of the present application. Apparently, the described embodiments are merely some, rather than all, of the embodiments of the present application. Based on the embodiments of the present application, all other embodiments obtained by those of ordinary skill in the art without creative efforts should belong to the protection scope of the present application.

The terms such as "first", "second", "third" and "fourth" in the specification, the claims, and the accompanying drawings of the present application are merely used to distinguish different objects and are not used to describe a specific sequence. In addition, the terms "include" and "have" as well as their other variations are intended to cover a non-exclusive inclusion. For example, a process, method, system, product or device including a series of steps or units is not limited to the steps or units clearly listed, but optionally can further include other steps or units not clearly listed or optionally can further include other steps or units inherent to the process, method, product or device.

The "embodiment" mentioned in the text means that specific features, results or characteristics described with reference to the embodiments can be included in at least one embodiment of the present application. The phrase that appears at different positions in the specification does not necessarily refer to the same embodiment and is not an independent or alternative embodiment mutually exclusive with other embodiments. It can be clearly or implicitly understood by those skilled in the art that the embodiment described in the text can be combined with other embodiments.

The electronic apparatus involved in the embodiments of the present application may include various handheld devices, vehicle-mounted devices, wearable devices, or computing devices having a wireless communication function, or other processing devices connected to a wireless modem, and various types of User Equipment (UE), Mobile Stations (MSs), terminal devices, and the like. For ease of description, the aforementioned devices are collectively referred to as a terminal. The operating system involved in the embodiments of the present invention is a software system that uniformly manages hardware resources and provides a service interface to users.

Figure 1:
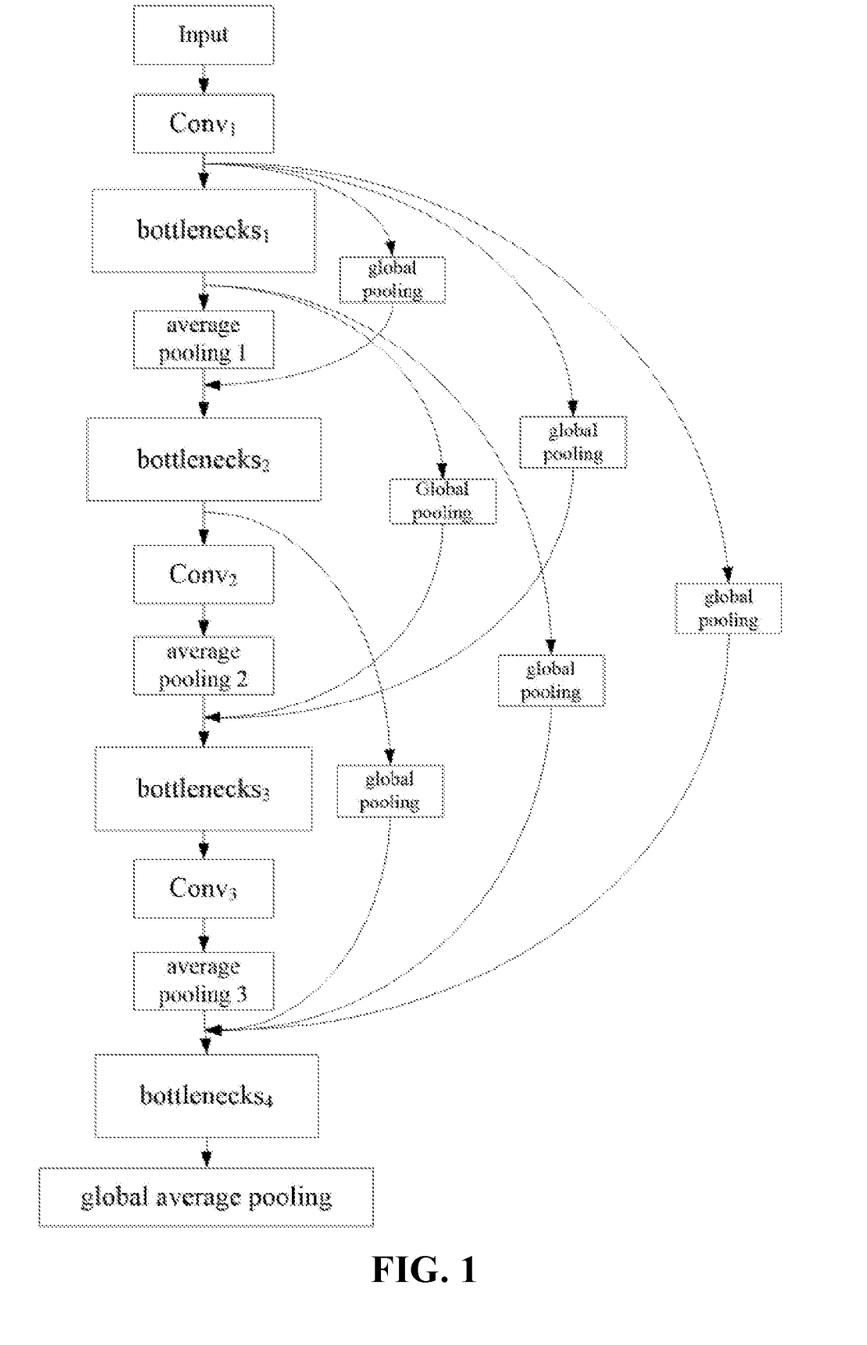
FIG. 1 is a schematic diagram of a network structure of a neural network model for face identification according to an embodiment of the present application.

First referring to FIG. 1, FIG. 1 is a schematic diagram of a network structure of a neural network model for face identification according to an embodiment of the present application. The neural network model shown in FIG. 1 may include the following network layers:

a first convolutional layer $Conv_1$, a second convolutional layer $Conv_2$, a third convolutional layer $Conv_3$, a first bottleneck network (i.e., first $bottlenecks_1$), a second bottleneck network (i.e., second $bottlenecks_2$), a third bottleneck network (i.e., third $bottlenecks_3$), a fourth bottleneck network (i.e., fourth $bottlenecks_4$), a first pooling layer (i.e., average pooling 1), a second pooling layer (i.e., average pooling 2), a third pooling layer (i.e., average pooling 3) and a fourth pooling layer (i.e., global average pooling).

The first convolutional layer $Conv_1$, the first $bottlenecks_1$, the first pooling layer (i.e., average pooling 1), the second $bottlenecks_2$, the second convolutional layer $Conv_2$, the second pooling layer (i.e., average pooling 2), the third $bottlenecks_3$, the third convolutional layer $Conv_3$, the third pooling layer (i.e., average pooling 3), the fourth $bottlenecks_4$ and the fourth pooling layer (i.e., global average pooling) are connected in series sequentially.

Optionally, the four bottlenecks network structures are connected in series. Therefore, as the convolution depth increases, dimensions of input data of relatively deep bottlenecks will become higher during convolution computation. In this case, the computing speed becomes lower. In order to reduce dimensions of a feature map and improve the computing speed, an output layer of the second $bottlenecks_2$ is connected to the second convolutional layer $Conv_2$ and the second pooling layer (i.e., average pooling 2) in series, and an output layer of the third $bottlenecks_3$ is connected to the third convolutional layer $Conv_3$ and the third pooling layer (i.e., average pooling 3) in series, so as to reduce dimensions of the input data.

The first convolutional layer $Conv_1$, the first $bottlenecks_1$, the first pooling layer (i.e., average pooling 1), the second $bottlenecks_2$, the second convolutional layer $Conv_2$, the second pooling layer (i.e., average pooling 2), the third $bottlenecks_3$, the third convolutional layer $Conv_3$, the third pooling layer (i.e., average pooling 3), the fourth $bottlenecks_4$ and the fourth pooling layer (i.e., global average pooling) are densely connected according to a dense connection policy of a dense network (Densenet). That is, input data of the first bottlenecks' comes from output data of the first convolutional layer $Conv_1$. Input data of the second $bottlenecks_2$ comes from fused data that is obtained after feature fusion is performed on output data of the first convolutional layer $Conv_1$ and output data of the first $bottlenecks_1$. Input of the third $bottlenecks_3$ comes from fused data that is obtained after feature fusion is performed on output data of the first convolutional layer $Conv_1$, output data of the first $bottlenecks_1$, and output data of the second $bottlenecks_2$. Input of the fourth $bottlenecks_4$ comes from fused data that is obtained after feature fusion is performed on the output data of the first convolutional layer $Conv_1$, output data of the first $bottlenecks_1$, output data of the second $bottlenecks_2$ and output data of the third $bottlenecks_3$. In order to ensure that input data of the last layer of bottlenecks comes from output data of all the previous bottlenecks, the connection manner in FIG. 1 is employed. That is, the first bottlenecks, the second bottlenecks, the third bottlenecks and the fourth bottlenecks are densely connected.

It can be seen that the neural network model provided by the embodiment of the present application employs a Dense- Block dense connection policy. Feature maps of multiple layers are fused to extract facial features, thus improving the accuracy rate of face identification. Moreover, the bottlenecks are densely connected in the embodiment of the present application, thus improving the computing speed compared with the conventional technology in which convolutional layers inside the bottlenecks are densely connected.

In the connection manner shown in FIG. 1, feature fusion is performed on all the input data of the first bottlenecks$_1$, the second bottlenecks$_2$, the third bottlenecks$_3$ and the fourth bottlenecks$_4$. In the present invention, feature fusion performed in the first bottlenecks' and the second bottlenecks$_2$ is taken as an example for specific description. As shown in FIG. 1, an output layer of the first convolutional layer Conv$_1$ is connected to 3 first global pooling layers (i.e., global poolings). The 3 first global poolings are used for scaling a feature map output by the first convolutional layer Conv$_1$, so that when being input to the second bottlenecks$_2$, the third bottlenecks$_3$ and the fourth bottlenecks$_4$, the scaled feature map can match with sizes of other input data of the second bottlenecks$_2$, the third bottlenecks$_3$ and the fourth bottlenecks$_4$, thus facilitating fusion of the input data. For example, the size of original input data Input is 224*224*3. After the original input data passes through the first convolutional layer Conv$_1$, a first feature map 112*112*64 is output. After the first feature map 112*112*64 is input to the first bottlenecks$_1$, a second feature map 112*112*64 is output. After the second feature map 112*112*64 is input to the first average pooling, a third feature map 56*56*64 is output. As shown in FIG. 1, the third feature map 56*56*64 is input to the second bottlenecks$_2$ as a part of input data of the second bottlenecks$_2$, and the other part of input data of the second bottlenecks$_2$ is the first feature map 112*112*64. It can be seen that the size of the first feature map 112*112*64 does not match with the size of the third feature map 56*56*64, and feature fusion cannot be performed. Therefore, a global pooling (specifically, a convolution kernel size can be set to [3*3] and the step size can be set to 2) is connected in series at an output end of the first convolutional layer Conv$_1$. After pooling of the global pooling, the size (that is, width and height) of the first feature map 112*112*64 is scaled to be 56*56, so that feature fusion can be performed on the two parts of input data of the second bottlenecks$_2$. Similarly, global poolings each connected in series at output ends of the first bottlenecks$_1$, the second bottlenecks$_2$ and the third bottlenecks$_3$ are all used for scaling feature maps output by the respective network structures connected in series with the global poolings, so as to perform feature fusion. The convolution kernel size of each global pooling needs to keep consistent with other input data of the first bottlenecks$_1$, the second bottlenecks$_2$, the third bottlenecks$_3$ and the fourth bottlenecks$_4$. Therefore, the convolution kernel sizes of the 6 global poolings shown in FIG. 1 are related to dimensions of feature maps output by the first pooling layer (i.e., average pooling 1), the second pooling layer (i.e., average pooling 2), and the third pooling layer (i.e., average pooling 3), which are not illustrated in detail here.

Optionally, in order to ensure sizes of the output data of the first bottlenecks$_1$, the second bottlenecks$_2$, the third bottlenecks$_3$ and the fourth bottlenecks$_4$ to be consistent with the size of the input data, a padding operation is added during convolution computation, and it is kept that padding=1.

As shown in FIG. 1, the first convolutional layer Conv$_1$ has a convolution kernel size of [3*3*64] and a step size of 2; the second convolutional layer Conv$_2$ has a convolution kernel size of [1*1*64] and a step size of 1; and the third convolutional layer Conv$_3$ has a convolution kernel size of [1*1*96] and a step size of 1.

Optionally, the first bottlenecks$_1$, the second bottlenecks$_2$, the third bottlenecks$_3$ and the fourth bottlenecks$_4$ include 3, 4, 6, and 3 sub-bottleneck networks (i.e., sub-bottlenecks) respectively, and the respective sub-bottlenecks in the first bottlenecks$_1$, the second bottlenecks$_2$, the third bottlenecks$_3$ and the fourth bottlenecks$_4$ are connected in series sequentially.

Figure 2:
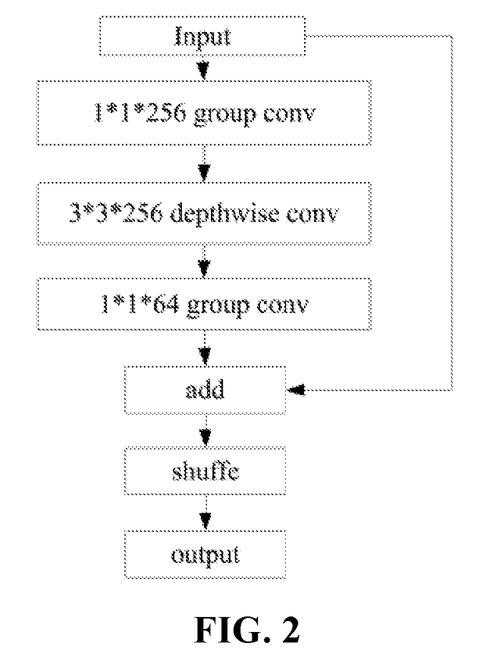
FIG. 2 is a schematic structural diagram of a sub-bottleneck network (i.e., sub-bottleneck) according to an embodiment of the present application.

As shown in FIG. 2, network structures of the sub-bottlenecks in the first bottlenecks$_1$, the second bottlenecks$_2$, the third bottlenecks$_3$ and the fourth bottlenecks$_4$ are the same. Any sub-bottleneck includes a first group convolutional layer (i.e., first group cony), a second group convolutional layer (i.e., second group cony), a first depth convolutional layer (i.e., first depthwise cony), a superposition layer (i.e., add) and a channel switching network layer (i.e., shuffle). The first group cony, the first depthwise cony, the second group cony, the add and the shuffle are connected in series sequentially. Input data and output data of any sub-bottleneck are superposed at the superposition layer (i.e., add), and the superposed data is input to the channel switching network layer (i.e., shuffle).

Further, the first group cony has a convolution kernel size of [1*1*256] and a step size of 1, the second group cony has a convolution kernel size of [3*3*256] and a step size of 1, and the first depthwise cony has a convolution kernel size of [1*1*64] and a step size of 1.

Figure 3:
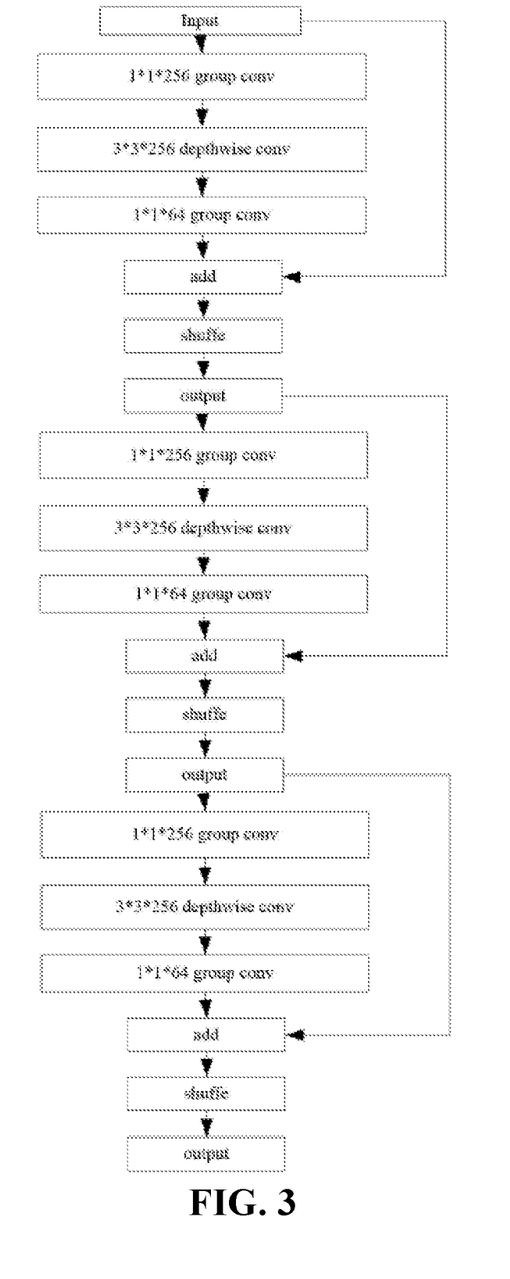
FIG. 3 is a schematic structural diagram of first bottlenecks' according to an embodiment of the present application.

The first bottlenecks$_1$, the second bottlenecks$_2$, the third bottlenecks$_3$ and the fourth bottlenecks$_4$ each consists of multiple sub-bottlenecks connected in series. Therefore, the first bottlenecks' are taken as an example for description. Referring to FIG. 3, FIG. 3 is a schematic structural diagram of the first bottlenecks$_1$. It can be seen that FIG. 3 includes 3 sub-bottleneck network structures, and the 3 sub-bottlenecks are connected in series sequentially. Refer to FIG. 3 for specific network structures of the second bottlenecks$_2$, the third bottlenecks$_3$ and the fourth bottlenecks$_4$. Details are not described here again.

It can be seen that the neural network model provided in the embodiment of the present application employs a dense connection manner. Feature maps output from multiple layers are fused, so that more face features are extracted, thus improving the success rate of face identification. Moreover, a 1*1 convolutional layer is connected in series after each bottleneck network structure (i.e., bottlenecks), thus reducing dimensions of the output feature map, and improving the computing speed. Moreover, the neural network model employs dense connection, which reduces convolution parameters and reduces memory of the neural network model. The neural network model can be embedded in an electronic apparatus to carry out face identification. In addition, in each bottleneck network (i.e., bottlenecks), dimensions are raised first by using a 1*1*256 convolutional layer to extract features, and then a 1*1*64 convolutional layer is used to reduce dimensions. Next, a 3*3*256 depthwise separable convolutional layer is used to reduce the model calculation amount. Finally, after shortcut connections (i.e., an add operation), a shuffle operation is performed on a convolution result of a 1*1*64 convolutional layer, to switch a channel sequence of the input data, thus improving the model precision.

Figure 4:
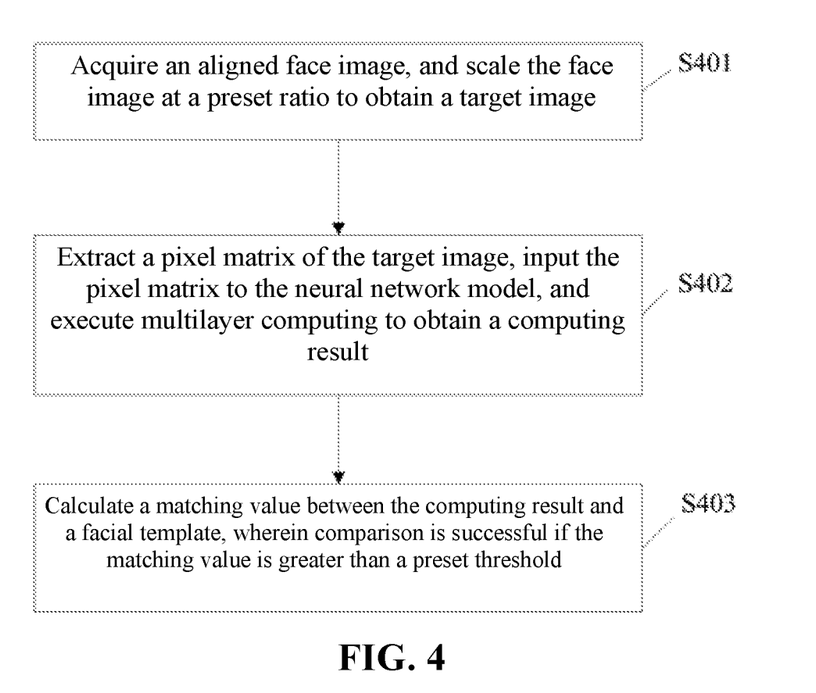
FIG. 4 is a schematic flowchart of a deep learning-based face identification method according to an embodiment of the present application.

Referring to FIG. 4, FIG. 4 is a schematic flowchart of a deep learning-based face identification method according to an embodiment of the present application. The method is applied to the foregoing neural network model, and the method includes the following steps:

Step S401: Acquire an aligned face image and scale the face image at a preset ratio to obtain a target image.

Optionally, before a face in a face image is identified, the face in the face image is aligned.

The preset ratio is a ratio value defined by the neural network model for input data, thus ensuring that a pixel matrix W*H of an input image is consistent with an input data size $W_o*H_o$ defined by the neural network model.

Step S402: Extract a pixel matrix of the target image, input the pixel matrix to the neural network model, and execute multilayer computing to obtain a computing result.

Optionally, the pixel matrix is input to the neural network model, and multilayer computing is executed to obtain a computing result. It can be understood that the last layer of the neural network model is average global pooling. It is known that the average global pooling pools each feature map to be a feature point. Therefore, after multilayer computing is performed on the pixel matrix, an output computing result is an N-dimensional feature vector, wherein N is an integer greater than or equal to 1.

Step S403: Calculate a cosine similarity degree between the computing result and a facial template vector, wherein comparison is successful if the cosine similarity degree is greater than a preset threshold.

The facial template is also an N-dimensional feature vector. A cosine similarity degree between the computing result (i.e., the N-dimensional feature vector) and the facial template vector is calculated. If the cosine similarity degree is greater than a preset threshold, it is determined that face comparison succeeds.

Optionally, the step of calculating a cosine similarity degree between the computing result (i.e., the N-dimensional feature vector) and the facial template vector is specifically as follows:

$$\cos\vartheta = \frac{\vec{A}*\vec{B}}{\|\vec{A}\|*\|\vec{B}\|}$$

wherein $\vec{A}$ is the N-dimensional feature vector of the computing result, and $\vec{B}$ is the N-dimensional feature vector of the facial template.

The preset threshold specifically may be 0.5, 0.6, 0.7, 0.8 or another value.

It can be seen that the neural network model provided in the embodiment of the present application employs a dense connection manner. Feature maps output from multiple layers are fused, so that more face features are extracted, thus improving the success rate of face identification. Moreover, during dense connection, a 1*1 convolutional layer is connected in series after each bottleneck network structure (i.e., bottlenecks), thus reducing dimensions of the output feature map, and improving the computing speed. Moreover, the neural network model employs a dense connection policy, which reduces convolution parameters and reduces memory of the neural network model. The neural network model can be embedded in an electronic apparatus to carry out face identification. In addition, an output result of the neural network model is a multidimensional feature vector. By calculating a cosine similarity degree between the feature vector of the output result and the feature vector of the facial template, the identification speed is further improved.

Figure 5:
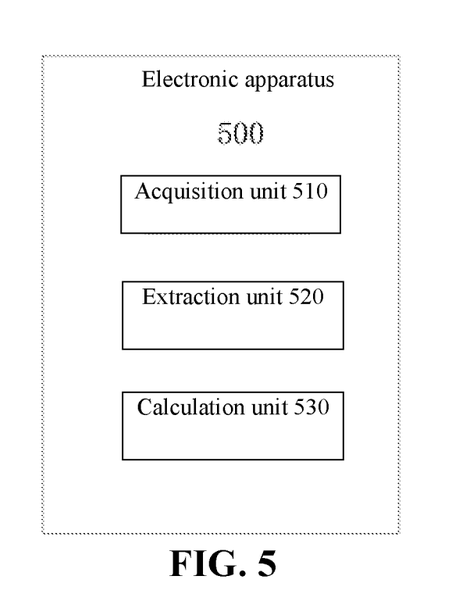
FIG. 5 is a functional structural diagram of an electronic apparatus for deep learning-based face identification according to an embodiment of the present application.

Consistent with the embodiment shown in FIG. 4 above, FIG. 5 is a block diagram of possible functional unit composition of an electronic apparatus 500 for deep learning-based face identification according to an embodiment of the present application. The electronic apparatus 500 includes: an acquisition unit 510, a computing unit 520, and a determining unit 530, wherein the acquisition unit 510 is configured to acquire an aligned face image, and scale the face image at a preset ratio to obtain a target image;

the computing unit 520 is used for an extraction unit, and is configured to extract a pixel matrix of the target image, input the pixel matrix to a trained neural network model, and execute multilayer forward computing to obtain a computing result; and a calculation unit 530 is configured to calculate a matching value between the computing result and a facial template, wherein comparison is successful if the matching value is greater than a preset threshold.

An embodiment of the present application further provides a computer storage medium. The computer storage medium stores a computer program used for electronic data interchange. The computer program enables a computer to perform some or all steps of any deep learning-based face identification method recorded in the foregoing embodiments.

An embodiment of the present application further provides a computer program product. The computer program product includes a nonvolatile computer readable storage medium storing a computer program, and the computer program is operable to enable a computer to perform some or all steps of any deep learning-based face identification method recorded in the foregoing embodiments.

It should be noted that the foregoing method embodiments are all expressed as a series of action combinations for ease of description. However, those skilled in the art should know that the present application is not limited by the described action sequence, because some steps can be performed in other sequences or simultaneously according to the present application. Secondly, those skilled in the art should also know that the embodiments described in the specification are all optional embodiments, and the actions and modules involved are not mandatory to the present application.

The descriptions about the foregoing embodiments have respective emphases. For a part not described in detail in one embodiment, reference can be made to related descriptions of other embodiments.

In the several embodiments provided in the present application, it should be understood that the disclosed apparatus may be implemented in other manners. For example, the apparatus embodiment described above is merely schematic. For example, the unit division is merely logical function division, and there may be other division manners in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in an electronic form or other forms.

Units described as separate parts may or may not be physically separate, parts displayed as units may or may not be physical units, and they may be located at the same place, or distributed on multiple network units. The objective of the solution of the embodiment may be implemented by selecting some or all of the units according to actual requirements.

In addition, functional units in the embodiments of the present application may be integrated in a processing unit, or the units may also exist physically separately, or two or more units may be integrated in one unit. The integrated unit may be implemented in the form of hardware or in the form of a software functional unit.

When the integrated unit is implemented in the form of a software functional unit and sold or used as an independent product, the integrated unit may be stored in a computer readable storage medium. Based on such an understanding, the technical solutions of the present application essentially, or the part making contributions to the prior art, or some or all of the technical solutions may be implemented in the form of a software product. The computer software product may be stored in a memory and include several instructions for instructing a computer device (which may be a personal computer, a server, a network device, or the like) to execute all or some steps of the methods in the embodiments of the present application. The foregoing memory includes any medium that can store program codes, such as a USB flash drive, a Read-Only Memory (ROM), a Random Access Memory (RAM), a mobile hard disk drive, a magnetic disk, or an optical disc.

Those skilled in the art can understand that all or some steps in the various methods of the foregoing embodiments may be completed by a program instructing related hardware. The program may be stored in a computer readable memory. The memory may include: a flash disk, a Read-Only Memory (ROM), a Random Access Memory (RAM), a magnetic disk, an optical disc, or the like.

The embodiments of the present application are described in detail. The principle and implementations of the present application are illustrated in this text through specific examples. The description about the foregoing embodiments is merely used for helping understand the method of the present application and core ideas thereof. At the same time, those of ordinary skill in the art can change the specific implementations and application scopes according to the ideas of the present application. In conclusion, the content of the specification shall not be construed as limitations to the present application.

The invention claimed is:

1. An apparatus for face identification comprising:
a memory; and
a processor configured to implement a neural network model, the neural network model including a series combination of a first convolutional layer, a first bottleneck network, a first pooling layer, a second bottleneck network, a second convolutional layer, a second pooling layer, a third bottleneck network, a third convolutional layer, a third pooling layer, a fourth bottleneck network, and a fourth pooling layer,
wherein the first convolutional layer, the first bottleneck network, the first pooling layer, the second bottleneck network, the second convolutional layer, the second pooling layer, the third bottleneck network, the third convolutional layer, the third pooling layer, the fourth bottleneck network and the fourth pooling layer are densely connected according to a connection policy,
wherein input data of each of the second, third, and fourth bottleneck networks is derived from output data of all precedent bottleneck networks,
wherein the input data of the third bottleneck network comprises output of the first bottleneck network which bypasses the second convolutional layer, the second pooling layer, and the second bottleneck network, and
wherein the input data of the fourth bottleneck network comprises: output of the first bottleneck network which bypasses the second convolutional layer, the second pooling layer, the second bottleneck network, the third convolutional layer, and the third bottleneck network, and the input of the fourth bottleneck network further comprises: output of the second bottleneck network which bypasses the third convolutional layer, the third pooling layer, and the third bottleneck network.

2. The apparatus of claim 1, wherein the neural network model further comprises six global pooling layers, three first global poolings in the six global poolings are used for pooling a feature map output by the first convolutional layer to obtain three first pooling results, and inputting the three first pooling results to the second bottleneck network, the third bottleneck network and the fourth bottleneck network respectively, so as to perform feature fusion on the three first pooling results and other input data of the second bottleneck network, the third bottleneck network and the fourth bottleneck network; two second global poolings in the six global poolings are used for pooling a feature map output by the first bottleneck network to obtain two second pooling results and inputting the two second pooling results to the third bottleneck network and the fourth bottleneck network respectively, so as to perform feature fusion on the two second pooling results and other input data of the third bottleneck network and the fourth bottleneck network; one third global pooling in the six global poolings is used for pooling a feature map output by the second bottleneck network to obtain one third pooling result and inputting the third pooling result to the fourth bottleneck network, so as to perform feature fusion on the third pooling result and other input data of the fourth bottleneck network.

3. The apparatus of claim 1, wherein the first bottleneck network, the second bottleneck network, the third bottleneck network and the fourth bottleneck network comprise 3, 4, 6, and 3 sub-bottleneck networks (sub-bottlenecks) respectively, and the respective sub-bottlenecks in the first bottleneck network, the second bottleneck network, the third bottleneck network, and the fourth bottleneck network are connected in series sequentially.

4. The apparatus of claim 3, wherein any sub-bottleneck network structure comprises a first group convolutional layer (i.e., first group cony), a second group convolutional layer (i.e., second group cony), a first depth convolutional layer (first depth-wise cony), a superposition layer, and a channel switching network layer;
the first group cony, the first depth-wise cony, the second group cony, the add, and the shuffle are connected in series sequentially;
the first group cony has a convolution kernel size of [1*1*256] and a step size of 1, the second group cony has a convolution kernel size of [3*3*256] and a step size of 1, and the first depth-wise cony has a convolution kernel size of [1*1*64] and a step size of 1; and
input data and output data of any of the sub-bottlenecks are superposed at the superposition layer, and then the superposed data is input to the channel switching network layer.

5. The apparatus of claim 1, wherein the first convolutional layer has a convolution kernel size of [3*3*64] and a step size of 2, the second convolutional layer has a convolution kernel size of [1*1*64] and a step size of 1, and the third convolutional layer has a convolution kernel size of [1*1*96] and a step size of 1.

6. The apparatus of claim 1, wherein the first pooling layer, the second pooling layer and the third pooling layer are all average pooling, the fourth pooling layer is global pooling, and the first pooling layer, the second pooling layer and the third pooling layer each have a convolution kernel size of [3*3] and a step size of 2.

7. The apparatus of claim 1, wherein the first convolutional layer, the first bottleneck network, the first pooling layer, the second bottleneck network, the second convolutional layer, the second pooling layer, the third bottleneck network, the third convolutional layer, the third pooling layer, the fourth bottleneck network and the fourth pooling layer are densely connected via a plurality of global pooling layers in accordance with the connection policy.

8. An apparatus for face identification comprising:
a memory; and
a processor configured to implement a neural network model, the neural network model including a series combination of
a first convolutional layer, a first bottleneck network, a first pooling layer, a second bottleneck network, a second convolutional layer, a second pooling layer, a third bottleneck network, a third convolutional layer, a third pooling layer, a fourth bottleneck network, and a fourth pooling layer, wherein
the first convolutional layer, the first bottleneck network, the first pooling layer, the second bottleneck network, the second convolutional layer, the second pooling layer, the third bottleneck network, the third convolutional layer, the third pooling layer, the fourth bottleneck network, and the fourth pooling layer are densely connected according to a connection policy, and wherein
the neural network model further comprises six global pooling layers, such that an output from the first convolutional layer is inputted via a corresponding global pooling layer to each of the second, third, and fourth bottleneck networks respectively, an output from the first bottleneck network is inputted via a corresponding global pooling layer to each of the third and fourth bottleneck networks respectively, and an output from the second bottleneck network is inputted via a global pooling layer to the fourth bottleneck network.

9. The apparatus according to claim 8, wherein the first bottleneck network, the second bottleneck network, the third bottleneck network and the fourth bottleneck network comprise 3, 4, 6, and 3 sub-bottleneck networks (sub-bottlenecks) respectively, and the respective sub-bottlenecks in the first bottleneck network, the second bottleneck network, the third bottleneck network, and the fourth bottleneck network are connected in series sequentially.

10. The apparatus according to claim 9, wherein any sub-bottleneck network structure comprises a first group convolutional layer (i.e., first group cony), a second group convolutional layer (i.e., second group cony), a first depth convolutional layer (first depth-wise cony), a superposition layer, and a channel switching network layer;

the first group cony, the first depth-wise cony, the second group cony, the add, and the shuffle are connected in series sequentially;

the first group cony has a convolution kernel size of [1*1*256] and a step size of 1, the second group cony has a convolution kernel size of [3*3*256] and a step size of 1, and the first depth-wise cony has a convolution kernel size of [1*1*64] and a step size of 1; and input data and output data of any of the sub-bottlenecks are superposed at the superposition layer, and then the superposed data is input to the channel switching network layer.

11. The apparatus of claim 8, wherein the first convolutional layer has a convolution kernel size of [3*3*64] and a step size of 2, the second convolutional layer has a convolution kernel size of [1*1*64] and a step size of 1, and the third convolutional layer has a convolution kernel size of [1*1*96] and a step size of 1.

12. The apparatus of claim 8, wherein the first pooling layer, the second pooling layer and the third pooling layer are all average pooling, the fourth pooling layer is global pooling, and the first pooling layer, the second pooling layer and the third pooling layer each have a convolution kernel size of [3*3] and a step size of 2.

13. The apparatus of claim 8, wherein the first convolutional layer, the first bottleneck network, the first pooling layer, the second bottleneck network, the second convolutional layer, the second pooling layer, the third bottleneck network, the third convolutional layer, the third pooling layer, the fourth bottleneck network and the fourth pooling layer are densely connected via a plurality of global pooling layers in accordance with the connection policy.

* * * * *